9336X
T. Neill,
Cage Trap,
Patented Jan. 23, 1836.
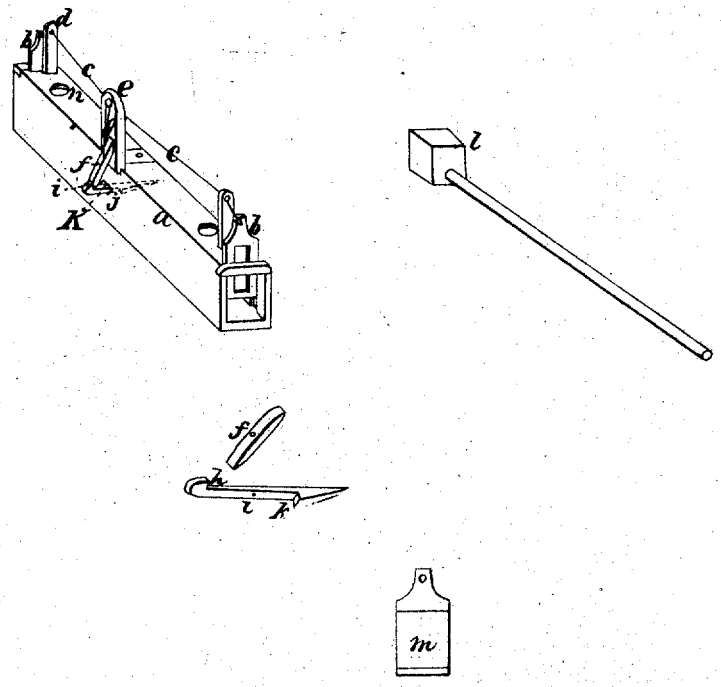
Fig. 3.
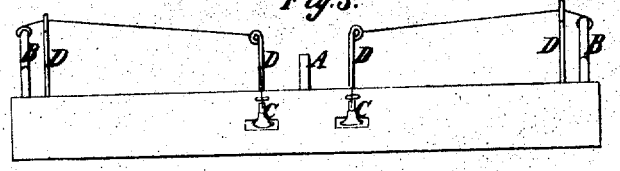

Thomas Neill, Kirkersville, Ohio.

Letters Patent.

The schedule referred to in these Letters Patent and making part of the same containing a description in the words of the said Thomas Neill himself of his improvement in the trap for catching Rats and other animals Be it known that I Thomas Neill of Kirkersville, Licking county State of Ohio have made an improvement being a trap for catching rats and other animals which is described as follows, reference being had to the annexed drawings of the same making part of this specification This trap consists of a Box (a) about six feet long and six inches square open at both ends having a drop or gate (b) at each end sliding in gains or grooves cut in the side pieces of the box, which gates are raised and held up by cords (c,) attached to the upper ends thereof passing through apertures in the ends of two posts (d) let into the top of the box near the ends of the same and leading through another aperture made in the end of a post (e) mortised into the side of the box, near the centre of the same, from which it leads to a trigger (f) to which it is fastened and one end of the trigger being set in a notch (g) cut in the last mentioned post and the other end set in a notch (h) cut in the end of the bait fork (i) passing through an opening (j) made in the side of the box directly under the middle post, which bait fork has a notch (k) near its centre which is set against the side of the opening just mentioned, The openings must all be lined with tin around their edges. The drawing represents the trap as set.

Before setting the trap the gates are to be propped up ~~up~~ during a period of time sufficient to accustom the rats to pass in and out of the trap without molestation. The props are then removed the fork baited and the trap set as before described the rats of course will be taken alive and will not be suffered to be killed within the trap because it has been found that rats will not enter so freely a trap in which others have been killed as otherwise They must therefore be discharged at one end by a rammer such as is represented at (b) and then destroyed by dogs or in some other manner, To catch muskrats a mirror (m) must be put on the inside of one of the gates with a light (n) let into the top of the trap above the mirror, The mirror is for the purpose of deceiving the musk rat by his own image, Another mode of construc-ting a trap is by having a slide with looking glasses on each side placed in the centre of the trap having two triggers and wire guides as represented in the annexed drawing (Fig 3) thus forming two traps—

What I claim as my invention & which I desire to secure by Letters Patent consists in the before described machine for catching rats and other animals I do not claim the use of the looking glass in traps

Thomas Neill

Witnesses
Wm. P. Elliot
Saml. [illegible]

W.H.

Drawings

594 [illegible]